(12) United States Patent
Kobayashi et al.

(10) Patent No.: US 6,520,009 B2
(45) Date of Patent: Feb. 18, 2003

(54) AIR FLOW RATE MEASURING APPARATUS

(75) Inventors: Chihiro Kobayashi, Naka-machi (JP); Shinya Igarashi, Naka-machi (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/034,117

(22) Filed: Jan. 3, 2002

(65) Prior Publication Data

US 2002/0056319 A1 May 16, 2002

Related U.S. Application Data

(63) Continuation of application No. 09/321,202, filed on May 27, 1999.

(30) Foreign Application Priority Data

May 27, 1998 (JP) ............................................ 10-145796

(51) Int. Cl.[7] ................................................ G01E 1/68
(52) U.S. Cl. ............................ 73/204; 73/118; 73/204; 73/118.2; 73/204.18; 73/204.19; 73/861.01; 123/478
(58) Field of Search ........................ 73/118, 204, 118.2, 73/204.18, 204.19, 861.01; 123/478

(56) References Cited

U.S. PATENT DOCUMENTS

| 4,311,042 A | * | 1/1982 | Hosoya et al. ............... 123/478 |
| 4,794,794 A | | 1/1989 | Djorup |
| 5,167,152 A | | 12/1992 | Shimizu et al. |
| 5,419,187 A | * | 5/1995 | Uchiyama .................. 73/118.2 |
| 5,681,989 A | | 10/1997 | Kanke et al. |
| 5,750,889 A | | 5/1998 | Kowatari et al. |
| 5,832,403 A | | 11/1998 | Kowatari et al. |

* cited by examiner

Primary Examiner—Hezron Williams
Assistant Examiner—Jewel Thompson
(74) Attorney, Agent, or Firm—Crowell & Moring, LLP (57) ABSTRACT

An air flow rate measuring apparatus generates a flow rate signal with a nonlinear characteristic from a flow rate detecting unit provided with a heat generating resistor and converts that into a signal with a linear characteristic by a linearizing circuit. Then, the flow rate signal is smoothed by a filter circuit to obtain a signal in which the measurement error due to a flow rate ripple is suppressed. Thereafter, the flow rate signal is again formed into a signal with a nonlinear characteristic by a nonlinear-form converting circuit to suppress resolution lowering due to analog-to-digital conversion.

6 Claims, 11 Drawing Sheets

AIR FLOW RATE MEASURING APPARATUS

This is a continuation of application Ser. No. 09/321,202, filed May 27, 1999.

BACKGROUND OF THE INVENTION

1. Field of the Invention

The present invention relates to an apparatus for measuring an air flow rate by using a heat generating resistor, and more particularly to an air flow rate measuring apparatus advantageously utilized for controlling the air-fuel ratio of an internal combustion engine of an vehicle.

2. Description of the Related Art

It has been well known that one of apparatus for measuring a flow rate of a fluid such as air is a flow rate measuring apparatus of a heat generating resistor type.

The flow rate measuring apparatus of the heat generating resistor type is utilized in such a manner that the heat generating resistor supplied with energy electically heated is provided in a fluid of which flow rate is under measurement. Then, the flowing velocity is detected by using that the quantity of heat taken away from the heat generating resistor by the fluid becomes a function of the flowing velocity, whereby the flow rate is measured.

Recently, because of the advantages that will be described later on, the flow rate measuring apparatus of the heat generating resistor type has been widely utilized for measuring an intake air flow rate for the air-fuel ratio control of an engine (internal combustion engine) of a vehicle.

According to the flow rate measuring apparatus of the heat generating resistor type, it is possible to measure the mass flow rate directly. For this reason, there can be obtained advantages that data obtained therefrom need not be corrected based on the atmospheric pressure or temperature.

Further, the flow rate measuring apparatus of the heat generating resistor type has a nonlinear characteristic such that the relationship between the flow rate and the detected signal exhibits a steep slope in the low flow rate region and the slope becomes gentler as the flow rate is increased. For this reason, it is possible to obtain a wide measurement range in which an error rate need not be differently set. Moreover, even if the flow rate is small with the result that the flow rate exhibits only a small change, it is possible to obtain an output voltage change large enough to be detected by an analog-to-digital converter with a reasonable resolution. Accordingly, the flow rate measuring apparatus of the heat generating resistor type is extremely advantageous in application to a control of idling engine speed for stabilizing the same.

Conversely, due to the nonlinear characteristic, the flow rate measuring apparatus requires a correction processing for linearizing the output. For this reason, in a prior art, as for example shown in FIG. 11, a flow rate signal V generated from a flow rate detecting unit 3 is supplied to an engine control unit 2 in which the flow rate signal V is subjected to a linearizing processing and also subjected to an averaging processing by a filter upon necessity. Thus, data indicative of an air flow rate Q is obtained.

Figure 11:
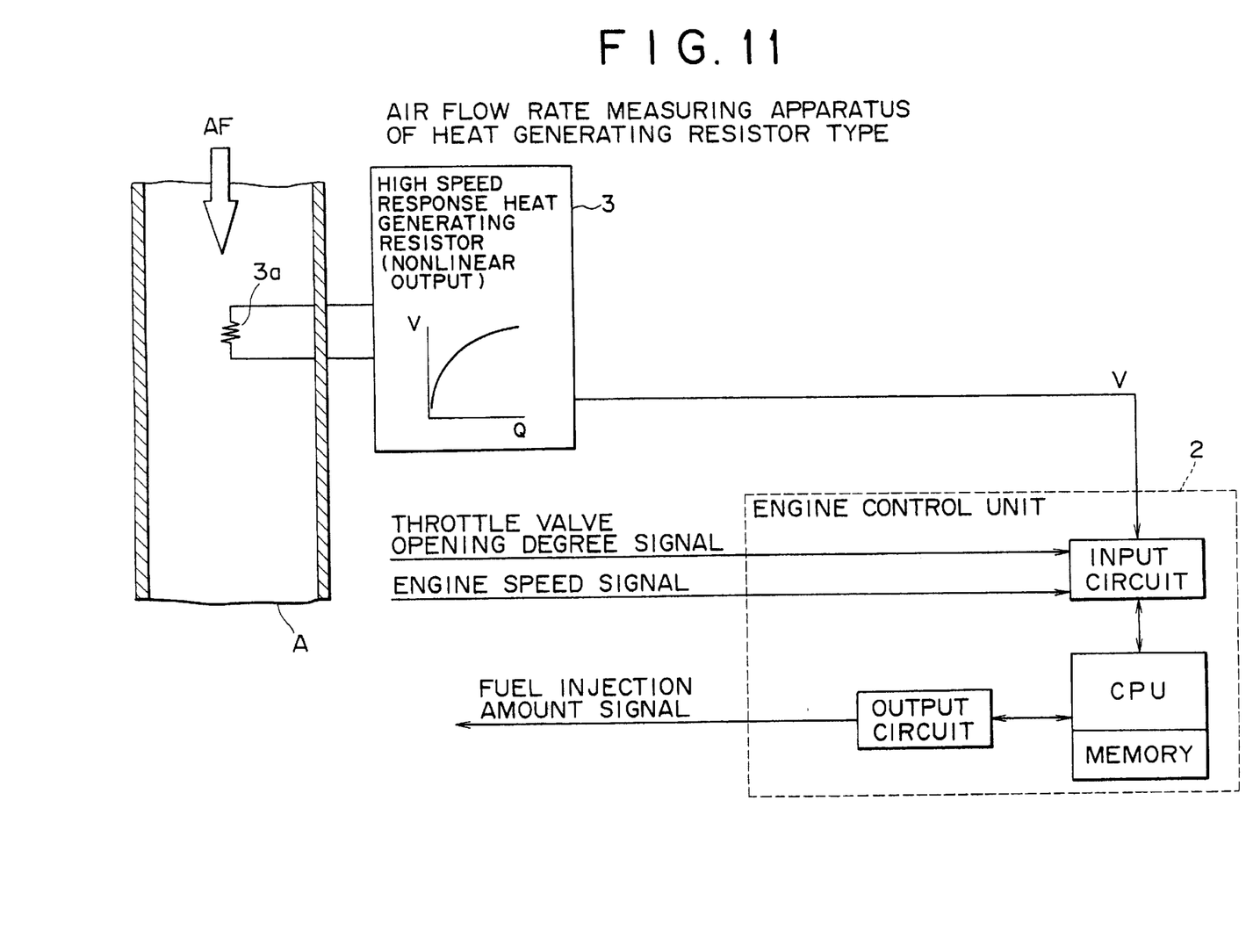
FIG. 11 is a block diagram showing one example of an air flow rate measuring apparatus of a heat generating resistor type according to a prior art technology.

The engine control unit 2 calculates a fuel injection amount for an engine under consideration of other parameters such as a throttle valve opening degree, an engine speed as shown in the figure. Thus, the air-fuel ratio for the engine is controlled for the engine not shown.

The flow rate detecting unit 3 is composed of a heat generating resistor 3a as a detecting element. The heat generating resistor 3a is provided within an air passage A such as an intake manifold of the engine or the like so that the heat generating resistor 3a is exposed to an intake air flow AF.

Figure 12:
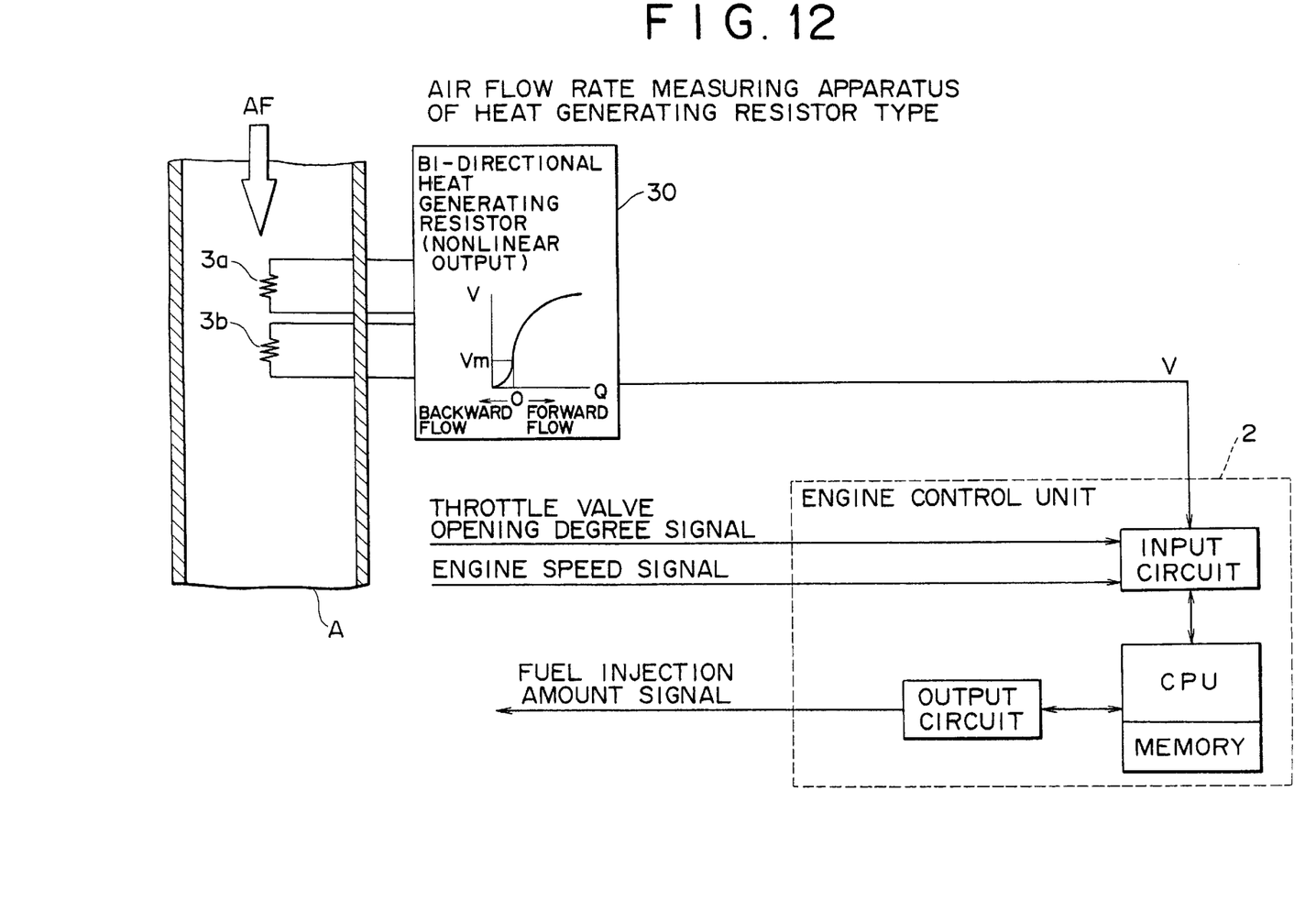
FIG. 12 is a block diagram showing one example of an air flow rate measuring apparatus of a heat generating resistor type with a backward flow detecting system according to a prior art technology.

On the other hand, there has been proposed a prior art arrangement of the flow rate measuring apparatus of the heat generating resistor type in which, as shown in FIG. 12, influence of backward flow caused from an intake air ripple of the engine within the intake manifold is corrected.

According to the prior art arrangement, as shown in FIG. 12, a flow rate detecting unit 30 is provided with, in addition to the original heat generating resistor 3a, another heat generating resistor 3b serving for detecting the backward flow of intake air with this arrangement, data indicative of an air flow rate Q having been subjected to the backward flow correction can be obtained.

A prior art relating to this kind of correction can be found in Japanese Patent Laid-Open No. Hei 8-94406, for example.

The above-described prior art, however, does not take into account deterioration in detection precision due to the averaging processing which is carried out by a filter in addition to the linearizing processing on the flow rate signal. Thus, the prior art will encounter the following difficulties.

As described above, the flow rate measuring apparatus of the heat generating resistor type has some advantages and disadvantages.

One of advantages is that the mass flow amount can be directly measured, the data obtained therefrom need not be corrected based on the change in atmospheric pressure or temperature. Another advantage is that the flow rate measuring apparatus of the heat generating resistor type has a nonlinear characteristic that the relationship between the flow rate and the output voltage exhibits a steep slope in a low flow rate region while a gentle slope in a high flow rate region. Therefore, even when the flow rate is low and thus it exhibits small flow rate fluctuation such as when the engine is placed in an idling drive mode, it is possible to obtain an output voltage fluctuation amount large enough to be detected by an analog-to-digital converter with a reasonable resolution, which fact is useful for stabilizing the idling speed of the engine.

Conversely, the flow rate measuring apparatus of the heat generating resistor type has a drawback that the nonlinear characteristic causes a measurement error.

This phenomenon is caused because the relationship between the flow rate and the output voltage is not linear, with the result that the mean value of the output voltage is decreased with respect to the mean value of the flow rate due to the engine speed ripple or the like.

This phenomenon particularly acts on increase in the air-fuel ratio (the ratio of fuel to air is decreased) in view of the engine control standpoint, leading to decrease in output of the engine.

Now, the drawback of the prior art will hereinafter be described.

Figure 13:
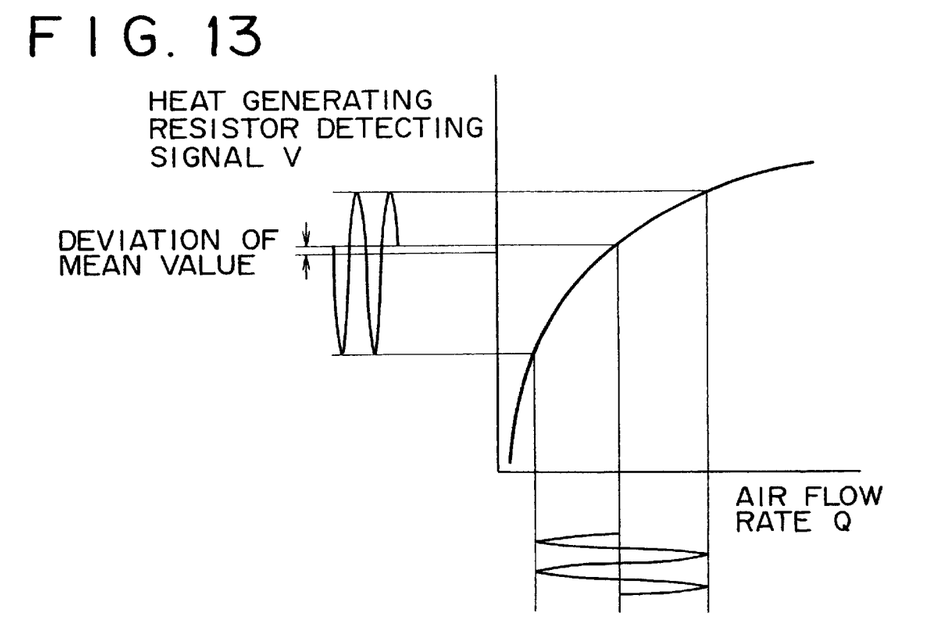
FIG. 13 is a characteristic diagram useful for explaining the nonlinearity of the heat generating resistor, * a ripple amplitude and the measurement error due to the filter.
Figure 14:
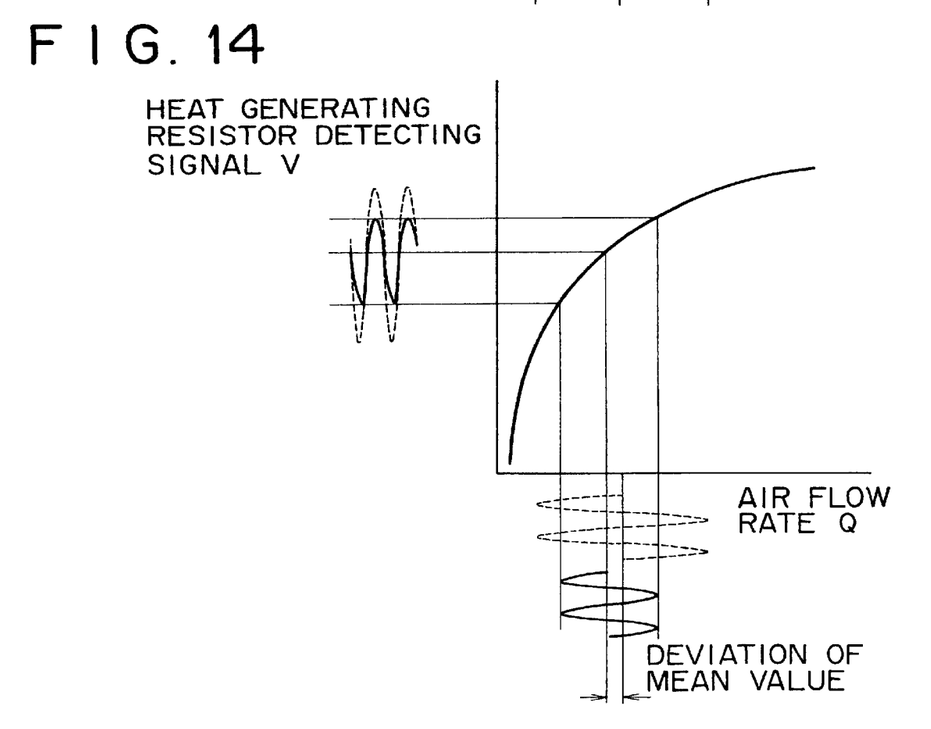
FIG. 14 is a characteristic diagram useful for explaining the nonlinearity of the heat generating resistor, a ripple amplitude and the measurement error due to the filter.

FIGS. 13 and 14 show the relationship between the ripple amplitude and the detected voltage of the heat generating resistor of the flow rate measuring apparatus of the heat generating resistor type according to the prior art arrangement shown in FIG. 11.

These diagrams are characteristic diagrams in which the air flow rate Q is plotted in abscissa while the voltage value V of the detected signal detected by the heat generating resistor 3a is plotted in ordinate. In this case, FIG. 13 is a characteristic diagram in which the engine control unit does not carry out the averaging processing with a hard filter while FIG. 14 is a characteristic diagram in which the engine control unit carries out the averaging processing with a hard filter or the like.

Since air flowing the intake manifold of the engine ripples with the opening and closing motion of the intake valve, the detected air flow rate is also rippled as shown in the figures.

Since the temperature of the heat generating resistor 3*a* substantially faithfully responds to the fluctuation of the air flow rate, the detected signal also ripples as shown in the figures.

At this time, since the voltage value characteristic of the detected signal detected by the heat generating resistor 3*a* relative to the air flow rate exhibits nonlinearity as shown in the figure, the mean value of the detected signal is decreased relative to the mean value of the original air flow rate Q, which fact leads to a measurement error derived from the nonlinearity of the heat generating resistor and the rippled amplitude.

However, if the heat generating resistor could detect the intake air ripple without any response delay, the detected ripple could be sequentially converted into the air flow rate, and the mean value thereof could be calculated, then the decrease in the means value as describe above should be avoided regardless of the deviation in the mean value of the detected signal.

However, even if the intake air ripple can be detected without any response delay by the heat generating resistor, it is very difficult to convert the intake air ripple component into the air flow rate continuously. Therefore, it is almost impossible in view of practical standpoint, since the air flow measuring apparatus of the heat generating resistor type is installed in an engine room of a vehicle, and the air flow rate measuring apparatus suffers from ignition noise or intake air disturbance which cause error in detected data. Further, too much calculation task can be imposed on a signal processing unit of the engine control unit.

For this reason, the prior art arrangement of the air flow rate measuring apparatus of the heat generating resistor type employs a hard filter for averaging the output voltage when the output voltage is supplied to an analog-to-digital converter in the engine control unit 2. A filter selected as the hard filter is ordinarily one composed of a resistor and a capacitor having a time constant of 1 to 20 ms.

As set forth above, FIG. 14 shows a characteristic of the air flow rate measuring apparatus when the apparatus employs a hard filter. Since the hard filter acts on the characteristic such that the amplitude is made small without changing the mean value of the output voltage value. Therefore, if the detected value is directly converted into the air flow rate, an error that the mean value of the converted air flow rate is also decreased is caused, resulting in a characteristic different from that shown in FIG. 13. In this case, however fast the analog-to-digital converter carries out the sampling operation, error will be caused in the detected flow rate value.

Recently, there are many cases in which two heat generating resistors are employed to detect the backward flow of air generated in the intake manifold and data is corrected based on the detected backward flow amount, whereby detecting precision of the flow rate measuring apparatus is increased. In this case, however, small backward flow will cause a large fluctuation in the output voltage. Therefore, averaging operation on the value of the output voltage gives an excessive backward flow amount compensation.

The above-mentioned drawback can be avoided by carrying out data sampling at a high rate and linearizing processing continuously. However, in order to avoid the drawback, it is necessary to carry out the processing at a sampling rate of at least 1 ms. Therefore, the engine control unit will be loaded with a heavy duty such as a high sampling speed, a large arithmetic operation task or the like that will not be requested when other type of sensors are employed.

Figure 15:
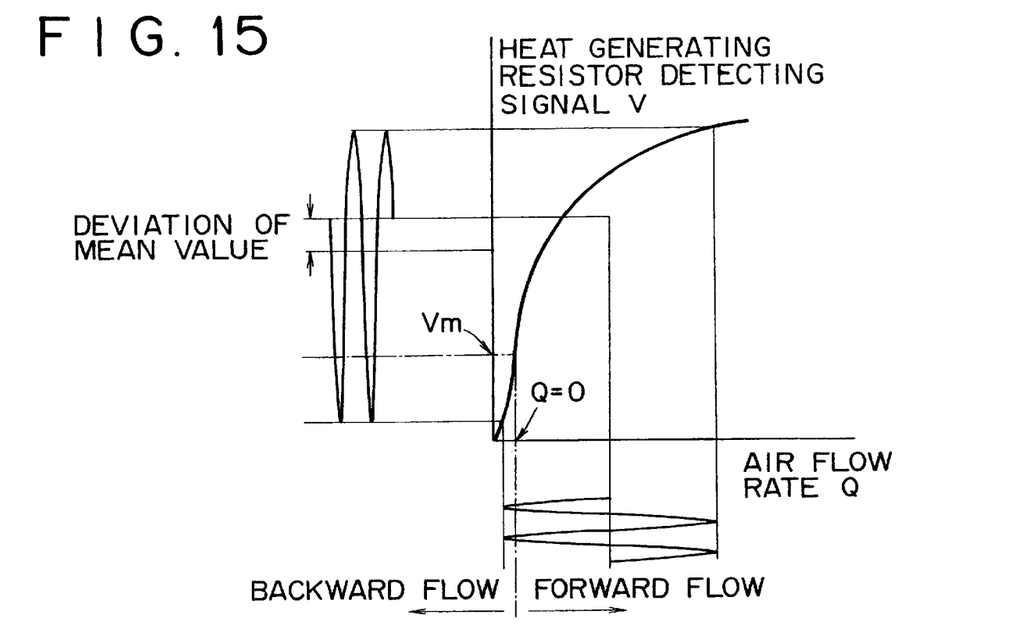
FIG. 15 is a characteristic diagram useful for explaining the nonlinearity of the heat generating resistor of the backward flow detecting system, a ripple amplitude and the measurement error due to the filter.

In detail, the prior art arrangement shown in FIG. 12 distinguishes the direction of air flow in such a manner that when the detected output voltage V is larger than the threshold value Vm (air flow ratio=0), the direction of the air flow is determined forward while when the detected output voltage V is smaller than the threshold value of Vm, the direction of the air flow is determined backward. In this case, similarly to the prior art shown in FIG. 11, if the prior art arrangement converts the output value into the air flow rate continuously without using a hard filter, the characteristic thereof becomes as shown in FIG. 15. At this time, as far as the mean value of the output voltage is concerned, measurement error excessive with respect to that in the case of FIG. 12 is caused. However, after the output voltage is converted into the air flow rate continuously, measurement value does not contain error.

Figure 16:
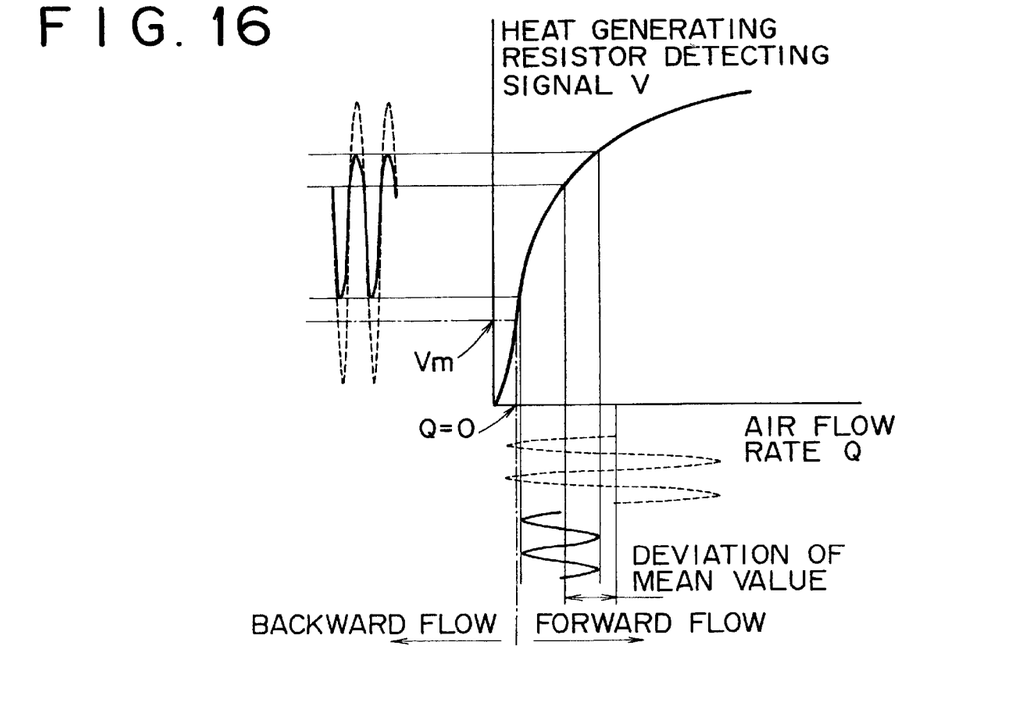
FIG. 16 is a characteristic diagram useful for explaining the nonlinearity of the heat generating resistor of the backward flow detecting system, a ripple amplitude and the measurement error due to the filter.

However, if the output voltage is converted into the air flow rate by way of a hard filter, as shown in FIG. 16, measurement error is left unremoved and it becomes impossible to detect the backward flow. Therefore, the original purpose, i.e., to detect backward flow cannot be accomplished.

As described above, the air flow rate measuring apparatus of the heat generating resistor type provides not only advantages but also disadvantages due to its nonlinear. characteristic, and hence it is difficult to take only an advantage thereof at the current stage, which fact is recognized as a problem to be solved.

SUMMARY OF THE INVENTION

Therefore, an object of the present invention is to provide an air flow rate measuring apparatus of a heat generating resistor type in which it is possible to adequately take the advantage of the air flow rate measuring apparatus of a heat generating resistor type and to obtain a high control precision when the air flow rate measuring apparatus of the heat generating resistor type is applied to the engine control.

In order to attain the above object, there is provided an air flow rate measuring apparatus having a flow rate detecting unit which is utilized for measuring air flow rate using a heat generating resistor provided in an air flow passage, including a linearizing circuit inputted with a signal indicative of a flow rate having a nonlinear characteristic from the flow rate detecting unit, a filter circuit inputted with a signal supplied from the linearizing circuit, and a nonlinear-form converting circuit inputted with a signal supplied from the filter circuit, wherein the output of the nonlinear-form converting circuit is extracted as a flow rate detecting signal.

Further objects and advantages of the present invention will be apparent from the following description which is given with reference to the accompanying drawings wherein preferred embodiments of the present invention is clearly shown.

DESCRIPTION OF THE PREFERRED EMBODIMENTS

An embodiment of the air flow rate measuring apparatus of a heat generating resistor type according to the present invention will hereinafter be described in detail with reference to the drawings.

Initially, the principle on which the air flow rate measuring apparatus of the heat generating resistor type will be described.

Figure 8:
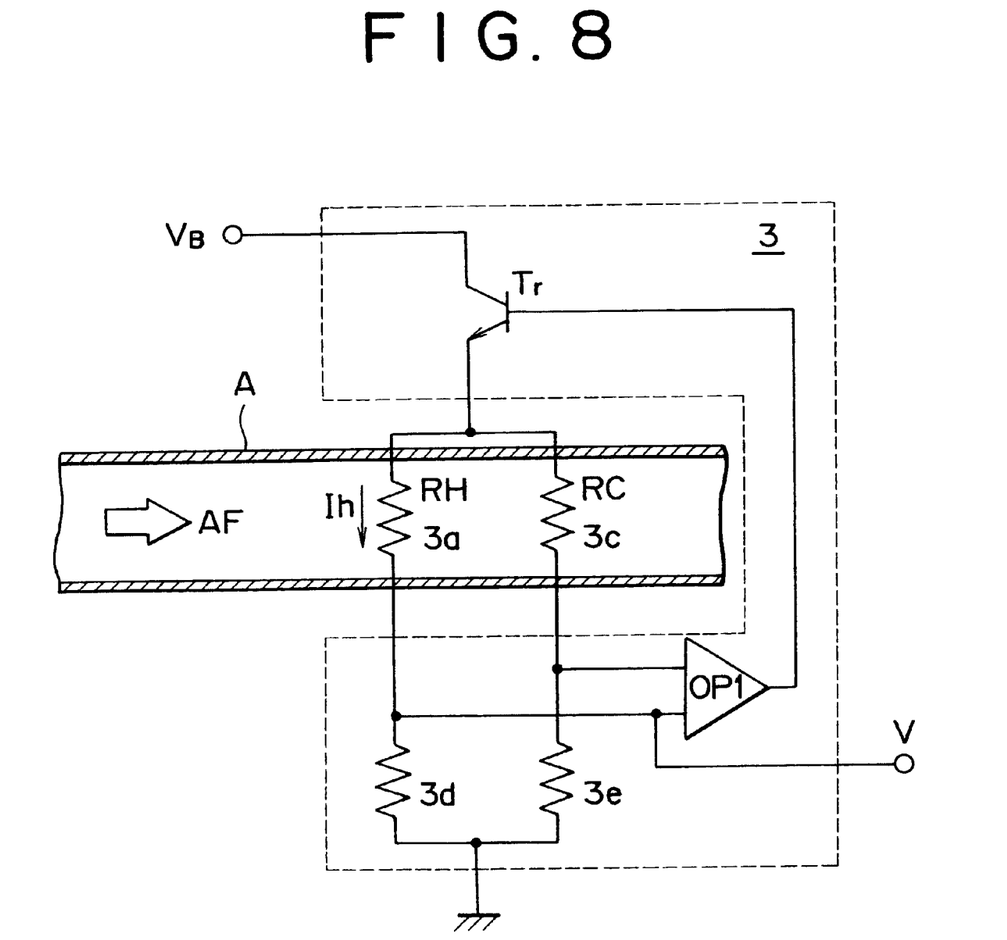
FIG. 8 is a circuit diagram showing one example of a flow rate detecting unit of the one embodiment of the present invention.

FIG. 8 is a circuit diagram of a flow rate detecting unit 3 of one example of the air flow rate measuring apparatus of the heat generating resistor type. The detecting unit 3 is mainly composed of a bridge circuit and a feedback circuit.

The bridge circuit is formed of a heat generating resistor 3a provided within an air flow passage A and a temperature sensing resistor 3c also provided within the air flow passage A and useful for intake air temperature compensation, and resistors 3d and 3e for constituting the bridge circuit.

The feedback circuit is formed of an operational amplifier OP1 and a transistor Tr.

The operational amplifier OP1 detects an unbalanced voltage from the bridge circuit and controls the current supplied through the transistor Tr to the bridge circuit based on the unbalanced voltage, whereby a feedback is effected on the circuit.

Owing to the feedback, a heating current Ih flowing through the heat generating resistor 3a is controlled so that temperature difference is constantly maintained between the heat generating resistor 3a and the temperature sensing resistor 3c. As a result, the heating current Ih is varied depending on the air flow rate.

That is, when the flow rate of the intake air flow AF is large, the amount of heat taken away from the heat generating resistor 3a becomes large, with the result that the amount of the heating current Ih is increased. When the flow rate of the intake air flow AF is small, the amount of heat taken away from the heat generating resistor 3a becomes small, with the result that the amount of the heating current Ih is decreased. As a result, the value of the heating current Ih becomes proportional to the flow rate of the intake air flow AF. Then the heating current Ih is converted into a voltage by the resistor 3d so that an output signal V indicative of an air flow rate Q is obtained.

Figure 9:
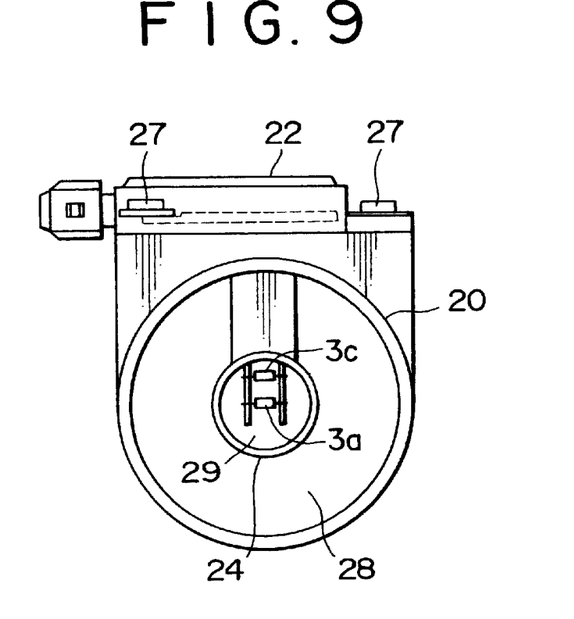
FIG. 9 is a front view showing one example of a flow rate detecting unit of the one embodiment of the present invention.
Figure 10:
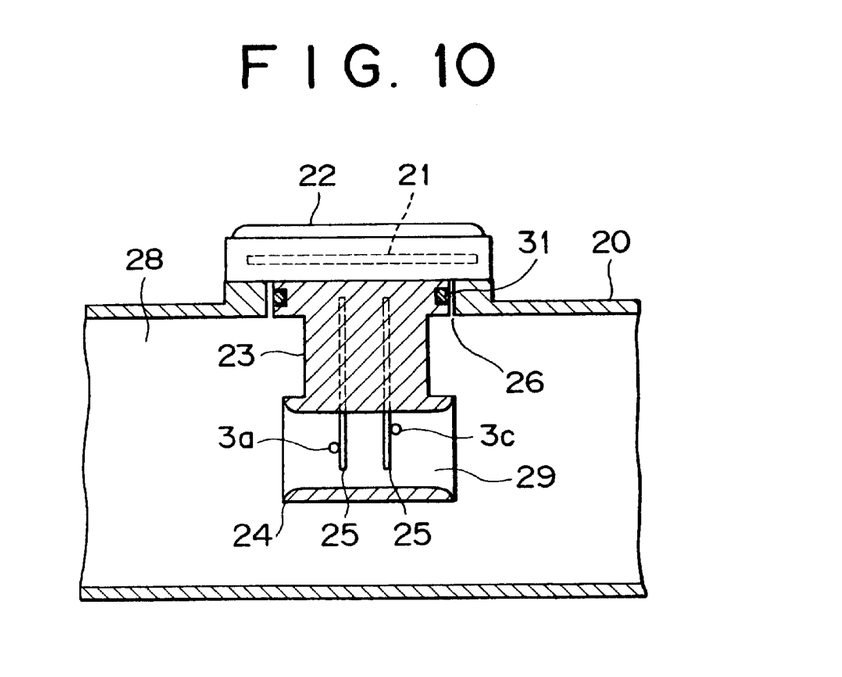
FIG. 10 is a side cross-sectional view showing one example of the flow rate detecting unit of the one embodiment of the present invention.

FIG. 9 is a frontal illustration as viewed from the upstream side of the air passage of one example of an air flow rate meter of the heat generating resistor type. FIG. 10 is a side cross-sectional view of the same. Thus, FIG. 9 is obtained when the air flow rate measuring apparatus is viewed from the left side in FIG. 10.

The air flow rate meter illustrated in these figures is mainly composed of a conduit member 20 forming a part of the air flow passage A, a housing member 22 in which a circuit board 21 is provided, a support member 23 made of a dielectric material, and a sub-air flow passage member 24.

The sub-air flow passage member 24 has two support bodies 25 made of a conductive wire material provided in the sub-air flow passage member 24. The support bodies 25 are provided with the heat generating resistor 3a and the temperature sensing resistor 3c and electrically connected to the circuit board 21. The whole assembly except for the conduit member 20 constitutes an integral module of the air flow rate meter.

The heat generating resistor 3a and the temperature sensing resistor 3c may be formed of a substrate made of glass, ceramic, silicon or the like covered with a thin film or thick film of platinum, tungsten or the like. The resultant parts can be utilized as the heat generating resistor and the temperature sensing resistor.

For example, a diaphragm is formed by using silicon, and the heat generating resistor is provided on the diaphragm.

The conduit member 20 is provided with an aperture 26 on its wall. The sub-air flow passage member 24 is inserted into the aperture 26, and the housing member 22 is attached to the conduit member 20 by means of screws 27, whereby the air flow rate meter is arranged such that the inner space of the conduit member 20 is utilized as a main air flow passage 28 and inner space of the sub-air flow passage member 24 is utilized as a sub-air flow passage 29.

In this arrangement, the conduit member 20 is provided with a sealing member 31 such as an O ring at the aperture 26 so that airtightness is maintained.

Now, one embodiment of the present invention will be described with reference to FIG. 1.

Figure 1:
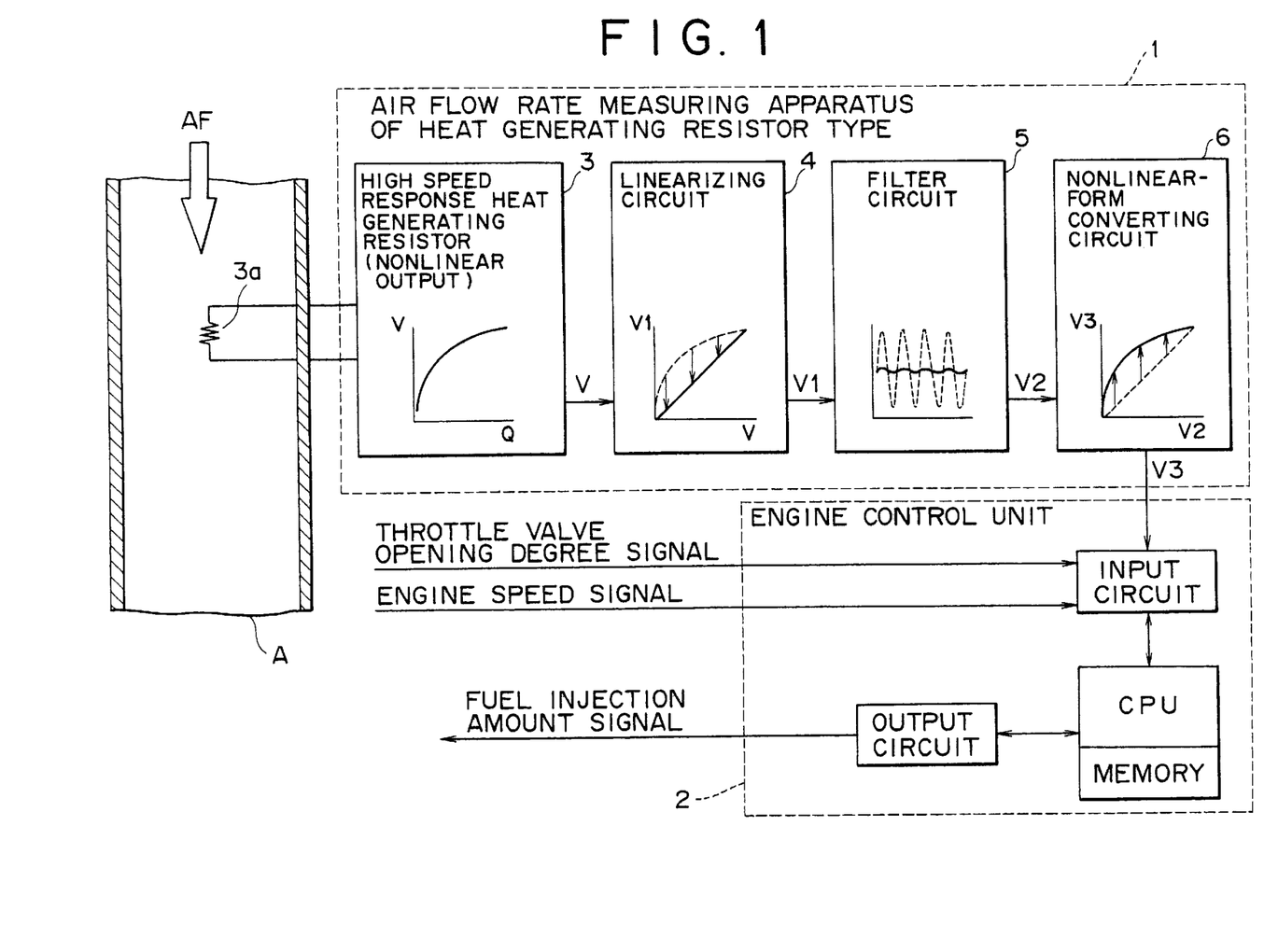
FIG. 1 is a block diagram showing one embodiment of an air flow rate measuring apparatus of a heat generating resistor type according to the present invention.

In FIG. 1, reference numeral 1 depicts an overall arrangement of the air flow rate measuring apparatus of the heat generating resistor type.

In the arrangement of the air flow rate measuring apparatus of the heat generating resistor type 1, reference numeral 4 depicts a linearizing circuit, 5 a filter circuit and 6 a nonlinear-form converting circuit. The rest of the arrangement is the same as that of the prior art arrangement described with reference to FIG. 11.

The main circuits constituting the air flow rate measuring apparatus of the heat generating resistor type 1 are mounted on the circuit board 21 shown in FIGS. 9 and 10.

Figure 6:
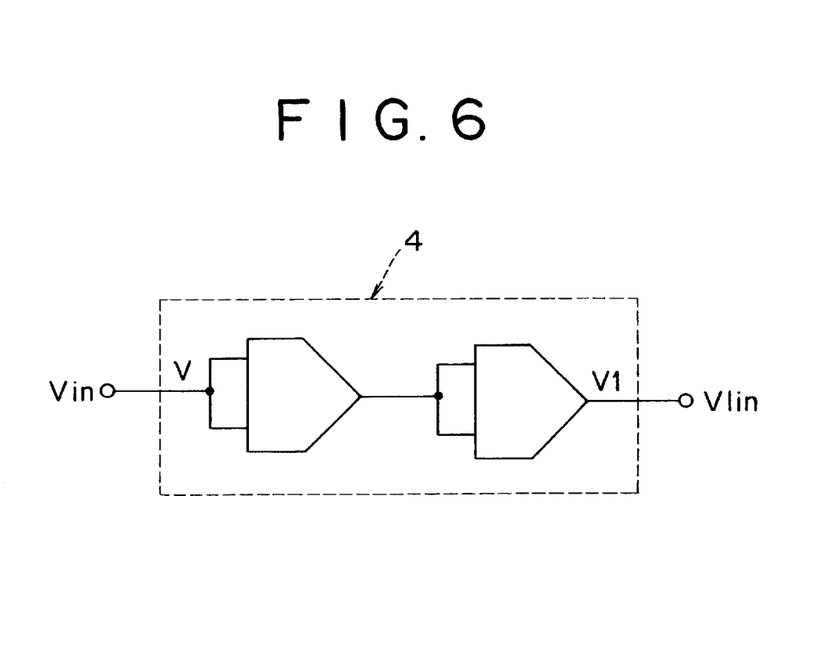
FIG. 6 is a block diagram showing one example of a linearizing circuit of the one embodiment of the present invention.

As for example shown in FIG. 6, the linearizing circuit 4 is formed of two-stage multiplying circuits connected to each other in a cascade fashion. The linearizing circuit 4 is supplied with the flow rate signal V generated from the heat generating resistor 3a, and serves as a converter which converts the flow rate signal V having a characteristic, i.e., a nonlinear characteristic with respect to the air flow rate Q into a signal having a linear characteristic with respect to the air flow rate.

It is known that the relationship between the flow rate signal V generated from the heat generating resistor 3a and the air flow rate Q is such that fourth power of the flow rate signal V is proportional to the air flow rate Q.

Thus, if the flow rate signal V is subjected to two-stage multiplying circuits connected in a cascade fashion, the flow rate signal V can be almost linearized. Thus, the linearizing circuit 4 can output a linearized flow rate signal V1.

The filter circuit 5 is formed of a CR hard filter composed of a resistor and a capacitor so as to have a time constant of 1 to 20 ms, for example. The filter circuit 5 has the function of suppressing the amplitude of the flow rate signal V1 without changing the mean value thereof. With this function, the filter circuit 5 generates a flow rate signal V2 having been subjected to the averaging operation.

Figure 7:
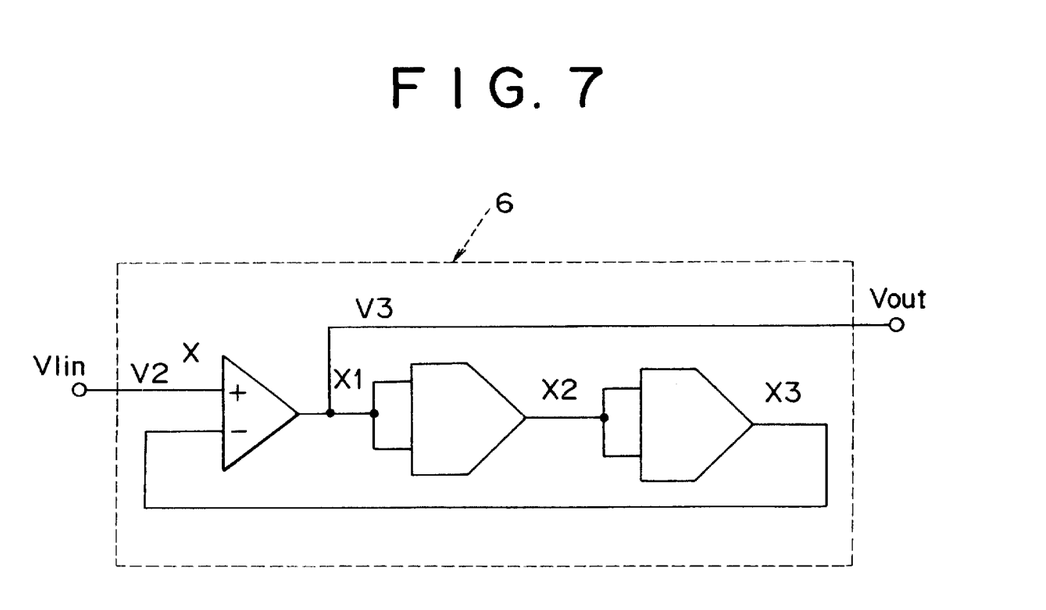
FIG. 7 is a block diagram showing one example of a nonlinear-form converting circuit of the one embodiment of the present invention.

As for example shown in FIG. 7, the nonlinear-form converting circuit 6 is formed of one operational amplifier and two multiplying circuits, supplied with the flow rate signal V2 generated from the filter circuit 5, and carries out a processing to convert the flow rate signal V2 into a signal having a predetermined nonlinear characteristic, i.e., a nonlinear characteristic opposite to the characteristic of the linearizing circuit 4. That is, the nonlinear-form converting circuit 6 converts the flow rate signal V2 which has been subjected to the linearizing processing in the linearizing circuit 4 into a flow rate signal V3 with a nonlinear characteristic which is the same as the characteristic of the signal having not been subjected to the linearizing processing.

In the nonlinear-form converting circuit 6 shown in FIG. 7, the input signal passing through the two-stage multiplying circuit is subtracted from the input signal by the operational amplifier so that a nonlinear characteristic opposite to the characteristic of the linearizing circuit 4 is obtained. As shown in the figure, if the non-inverted input signal Vin=V2 of the operational amplifier is denoted with a symbol X, the output of the operational amplifier is X1, the output of the first stage multiplying circuit of the operational amplifier is X2, and the output of the second stage multiplying circuit of the operational amplifier is X3, then the relationship among them can be expressed as follows.

$X2 = X1^2$
$X3 = X2^2 = X1^4$
$X3 = X$
$X = X1^4$
$\therefore X1 = Vout = $ fourth root of (X)

Thus, it is possible to obtain the nonlinear-form converting circuit 6 having a fourth root characteristic opposite to the fourth power characteristic of the linearizing circuit 4.

The engine control unit 2 takes the flow rate signal V3 into itself and linearizes the flow rate signal V3 to produce an air flow rate Q, similarly to the prior art technology. Further, the engine control unit 2 is supplied with a throttle valve opening degree signal, an engine speed signal or the like. Then, the engine control unit 2 calculates a fuel injection amount necessary for maintaining the engine combustion condition optimum based on these signals, and supplies the resultant signal to a fuel injection valve of the engine as a fuel injection amount signal.

Now, the operation of the embodiment will be described.

According to the above-described embodiment, the flow rate signal V generated from the flow rate detecting unit 3 is subjected to the linearizing processing in the linearizing circuit 4, also subjected to the averaging processing in the filter circuit 5 formed of the hard filter, and then the flow rate signal V2 is obtained.

In any cases, the detection error of the abovedescribed prior art technology results from the operation that the output voltage value obtained from the heat generating resistor is subjected to the averaging processing in the hard filter and thereafter the resultant signal is converted into a signal indicative of the air flow. Therefore, if, as in the present embodiment, the detecting signal detected from the heat generating resistor 3a having a high speed response characteristic is initially subjected to the linearizing processing in the linearizing circuit 4 and thereafter subjected to the averaging in the filter circuit 5, the error inherent in the above-described prior art technology will be eliminated.

Accordingly, if the problem to be solved by the present invention was only the error inherent in the above-described prior art technology, it should be sufficient to form an arrangement that the output of the flow rate detecting unit 3 is supplied to the linearizing circuit 4 to be subjected to the linearizing processing and then supplied to the filter circuit 5 to be averaged.

However, the above-arrangement conversely will cause a problem described as follows. For this reason, the embodiment of the present invention is further provided with a nonlinear-form converting circuit 6, as shown in the figure.

That is, a problem raised in this case is an input resolution of an analog-to-digital converter upon low flow rate such as when the engine is placed in an idling mode.

Although not shown in the figure, the analog-to-digital converter is provided within the engine control unit 2, and functions to convert the supplied flow rate signal into a digital signal. A general analog-to-digital converter employed in a vehicle is one having an input resolution of ten bits. In such a case, an input voltage extending in a full scale is divided into 1024 unit portions.

On the other hand, an input voltage to be processed by a microcomputer for use in a vehicle extends in a range of from 0.0 V to 5.12 V. In this case, the minimum resolution becomes about 5 mV.

Figure 2:
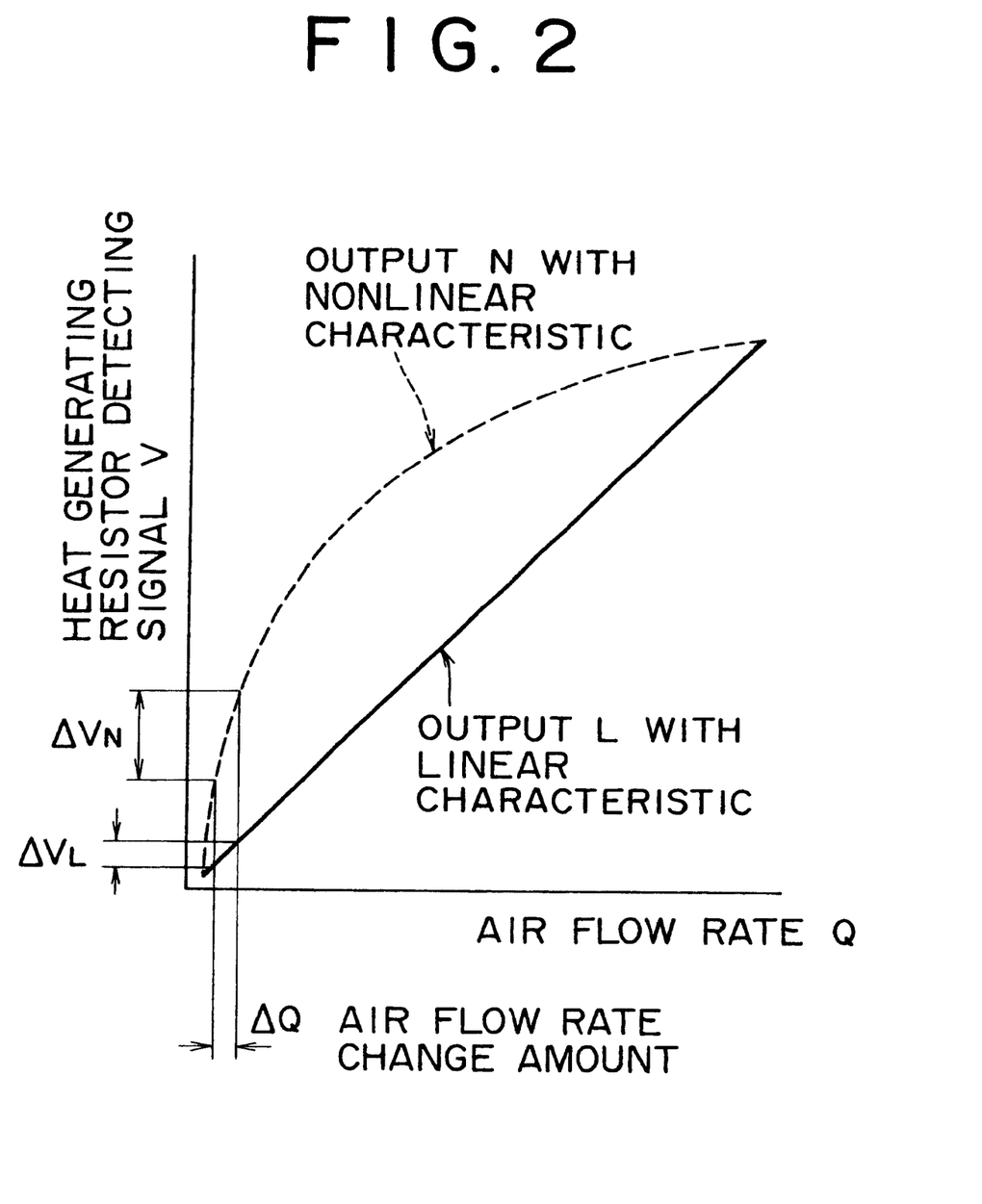
FIG. 2 is a characteristic diagram useful for explaining resolution of the linear characteristic and nonlinear characteristic on the relationship between the output voltage of the heat generating resistor and the idling flow rate in the one embodiment of the present invention.

Now, if the detected signal is not subjected to the linearizing processing and left unprocessed to be a signal with a nonlinear characteristic N as shown in FIG. 2, the change amount of the output voltage corresponding to the change amount of ΔQ in the air flow rate Q becomes $\Delta V_N$, which is large enough in terms of resolution. Therefore, no problem will be caused. This is one of remarkable features of the air flow rate measuring apparatus, as described above.

However, if the detected signal is subjected to the linearizing processing to become a signal with a linear characteristic L, i.e., the signal passes through only the linearizing circuit 4 and the filter circuit 5, then, the voltage change amount of the detected signal corresponding to the same flow rate change amount $\Delta Q$ becomes $\Delta V_L$, which is far smaller as compared with the change amount $\Delta V_N$ obtained when the detected signal is left unprocessed to be a signal with a nonlinear characteristic.

How much change amount in the output voltage will be obtained with respect to the air flow rate change of 1% amount is examined under a condition that the engine is substantially driven within a range of an idling speed. If the detected signal is converted into a signal with a nonlinear characteristic N as shown in FIG. 2, then a detected voltage change amount of about 5 mV is obtained. This value is large enough to be detected as the air flow change by an analog-to-digital converter having ten bits resolution. Therefore, it is possible to utilize the detection result for engine control.

Conversely, if the detected signal is processed to have a linear characteristic L, the obtained change amount is merely about 1 mV, which is too small to be detected as the air flow rate. As a result, if the detection result is applied to the engine control, the engine control becomes unstable when the engine is driven at the idling speed.

For this reason, the embodiment shown in FIG. 1 is provided with the nonlinear-form converting circuit 6, by which the flow rate signal V2 with the linear characteristic L generated from the linearizing circuit 4 is processed to have a nonlinear characteristic. Thus, the flow rate signal is again formed into the flow rate signal V3 having the nonlinear characteristic N which is the same as the signal before the stage of processing in the linearizing circuit 4, and then supplied to the engine control unit 2.

Therefore, according to the embodiment of FIG. 1, it is possible to adequately suppress the lowering phenomenon in the output from the heat generating resistor 3a caused from the ripple of the amplitude. Accordingly, it is possible to positively eliminate the fear that the change amount of the output voltage becomes smaller than the resolution of the analog-to-digital converter.

Moreover, the analog-to-digital converter on the side of the engine control unit 2 need not carry out sampling operation at a high rate. Therefore, to lighten the load of arithmetic operation will not increase error in measurement of the air flow.

At this time, according to the prior art technology, when the mean air flow rate is calculated, the output signal obtained from the air flow rate measuring apparatus should be sequentially converted into the air flow rate within the engine control unit. However, according to the present embodiment, the air flow rate can be calculated from the mean value of the output voltage of the air flow rate measuring apparatus of the heat generating resistor type.

In other words, according to the embodiment, on the side of the engine control unit, it is allowable to apply a. hard filter having a large time constant which is permissible in terms of engine control prior to the processing by the analog-to-digital converter. Owing to this fact, the load imposed on the engine control unit 2 can be remarkably decreased.

Further, according to the present embodiment, the air flow rate measuring apparatus is tough against noise caused from ignition or the like. Therefore, error caused from noise can be satisfactorily suppressed and the engine can be controlled with high precision.

The reason is that when the air flow rate measuring apparatus is applied to control of an engine of a vehicle and the air flow rate signal is supplied from the air flow rate detecting unit to the control unit, if influence of noise on other equipment is considered, it is considerably advantageous to supply a signal with a nonlinear characteristic to an interface of the control unit for controlling the flow rate in view of S/N standpoint.

Another embodiment of the present invention will hereinafter be described.

Figure 3:
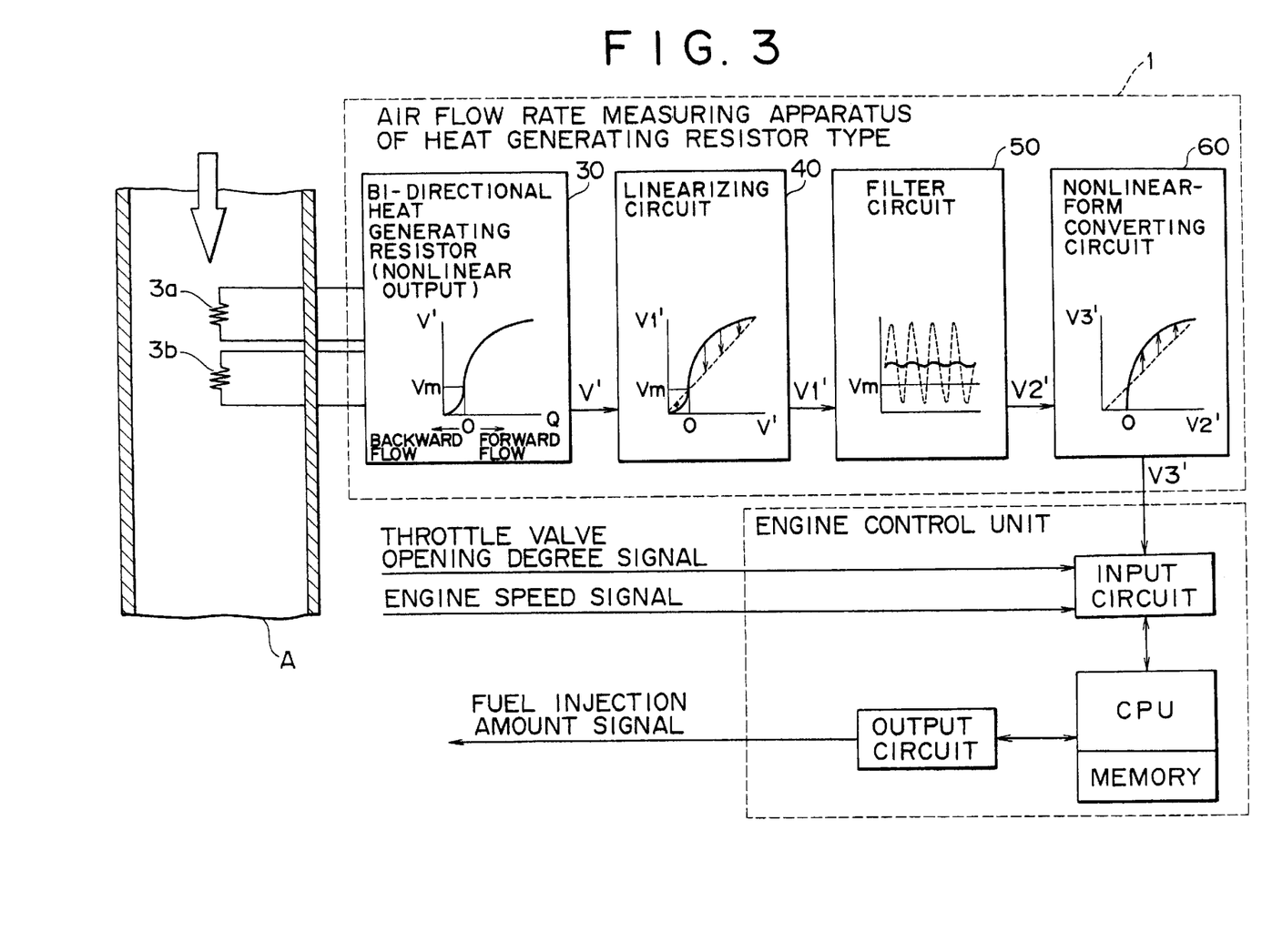
FIG. 3 is a block diagram showing another embodiment of an air flow rate measuring apparatus of a heat generating resistor type according to the present invention.

FIG. 3 shows another embodiment of the present invention in which the overall arrangement thereof is fundamentally the same as that of the embodiment shown in FIG. 1 but the arrangement shown in FIG. 3 is replaced at the flow rate detecting unit 3 with a flow rate detecting unit 30. The flow rate detecting unit 30 includes two heat generating resistors 3a, 3b in the flow rate detecting unit 3. The two heat generating resistors 3a, 3b are utilized for detecting backward flow by heat transaction between them and correcting the detected data. The detection style thereof the same as that of the prior art technology shown in FIG. 12.

Figure 4:
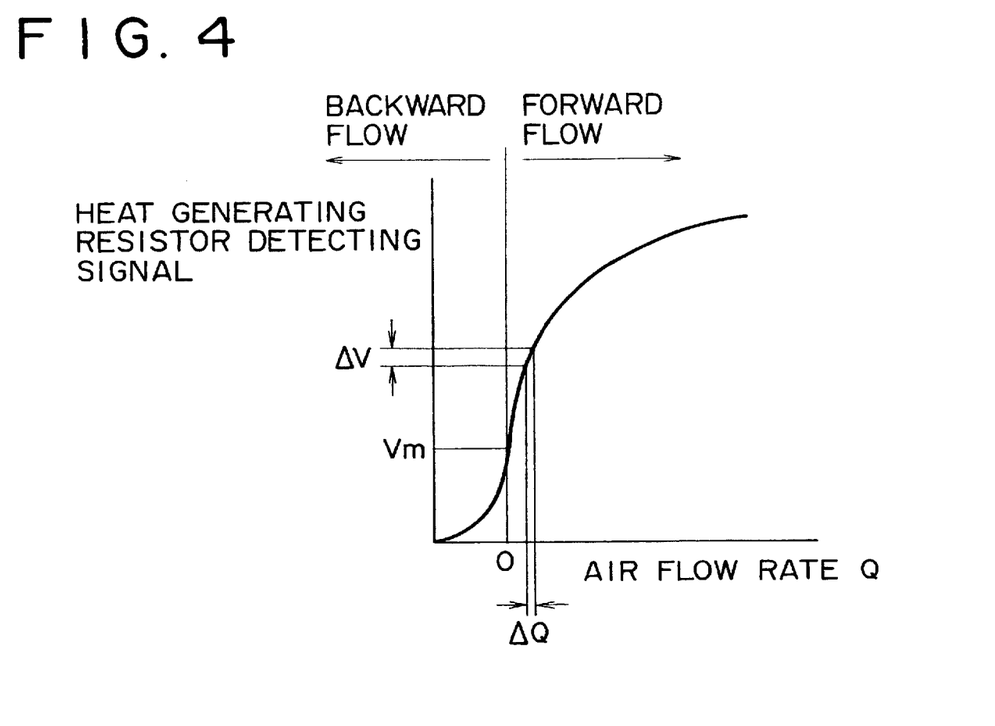
FIG. 4 is a characteristic diagram useful for explaining the nonlinearity of the heat generating resistor due to backward flow, a ripple amplitude and the measurement error due to a filter.

According to the embodiment shown in FIG. 3, the output characteristic of the detecting unit 30 is such that the output range corresponding to the forward flow and the output range corresponding to the backward flow are divided at a threshold value Vm of the output voltage, as shown in FIG. 4. For this reason, the change amount $\Delta V$ corresponding to the air flow change amount $\Delta Q$ which might be small when the engine is driven at an idling speed, becomes considerably small as compared with the change amount $\Delta V$ shown in FIG. 5 detected by the detecting unit 3 which dose not detect backward flow. Therefore, if no countermeasure is taken, the idling speed becomes unstable.

However, according to the embodiment shown in FIG. 3, a flow rate signal V' that is an output from the flow rate detecting unit 30 having the heat generating resistors 3a, 3b is once linearized in a linearizing circuit 40 and thereafter sent to a filter circuit 50 in which a ripple amplitude is suppressed until a signal V2' containing no backward flow component is obtained without changing the mean value of the waveform of the flow rate signal V1' containing a backward flow component.

Figure 5:
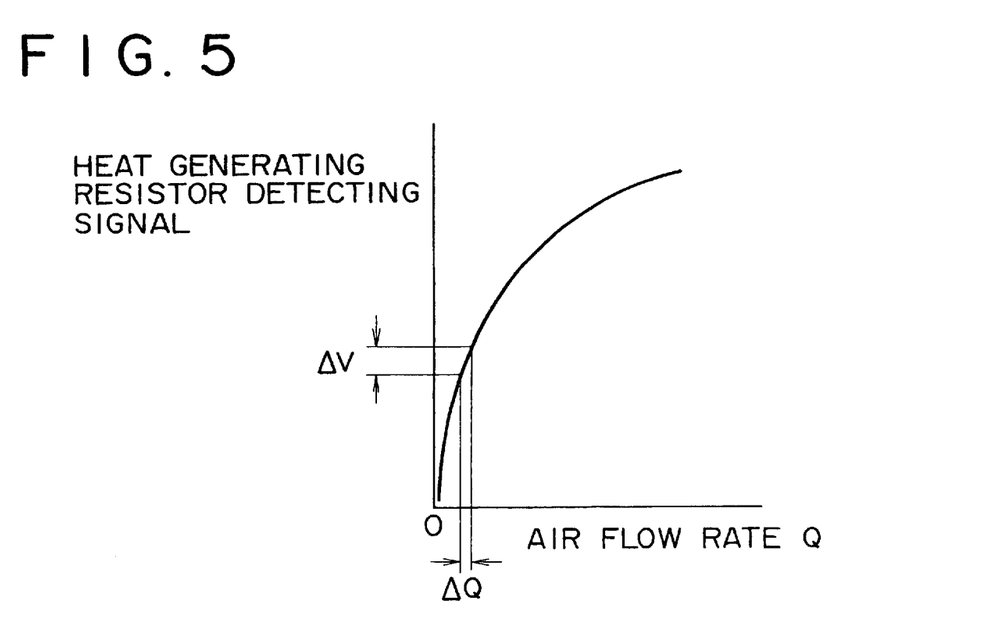
FIG. 5 is a characteristic diagram useful for explaining the nonlinearity of the heat generating resistor, a ripple amplitude and the measurement error due to a filter.

In this way, since the flow rate signal is formed into a ripple waveform containing no backward flow component, the output voltage range need not be divided into the range of forward flow and the range of backward flow at a threshold value Vm, as shown in FIG. 4. Therefore, when the flow rate signal is converted into a signal with a nonlinear characteristic in a nonlinear-form converting circuit 60, the signal can be converted into one extending within a range as shown in FIG. 5 in which only the forward flow is to be considered.

Therefore, also according to the embodiment of FIG. 3, it is needless to say that the effect obtained by the embodiment shown in FIG. 1 can be expected. Moreover, when the embodiment shown in FIG. 3 is applied for controlling an engine, it is possible to avoid the already described instability phenomenon in the idling speed caused from that the change amount of the output voltage becomes smaller than the input resolution of the analog-to-digital converter. Furthermore, it is possible to satisfactorily decrease the measurement error due to the backward flow.

Incidentally, according to the above embodiments, either of the flow rate signals V3, v3' generated from the air flow measuring apparatus of the heat generating resistor type is made into a signal with a nonlinear characteristic. Therefore, these signals are apparently the same as the flow rate signal V of the prior art technology shown in FIGS. 11 and 12.

Therefore, according to the above embodiments, when the air flow measuring apparatus is applied for controlling an engine of a vehicle, the apparatus can be dealt in the same manner as that of the air flow measuring apparatus of the heat generating resistor type. Accordingly, the air flow measuring apparatus of the heat generating resistor type according to the present invention offers satisfactory compatibility with that of the prior art technology when it is applied to an engine control unit.

According to the present embodiment, it is possible to prevent the output voltage from being lowered due to the nonlinear characteristic of the heat generating resistor and the intake air ripple of the engine. Further, it is possible to keep the change amount of the output voltage supplied to the engine control unit larger than the resolution of the analog-to-digital converter. As a result, when the air flow measuring apparatus of the heat generating resistor type according to the present invention is applied for controlling an engine, it is possible to obtain a precise and stable control with ease even if the air flow rate stays in a low rate region such as when the engine is driven in a region of idling speed.

Although several embodiments have been described above, these embodiments are merely illustrative and not restrictive. Therefore, it is apparent to those skilled in the art that various changes and modifications can be effected without departing from the spirit and scope of the invention, and thus these changes or modifications should be embraced within the spirit and scope of the claims appended hereto.

What is claimed is:

1. An air flow rate measuring apparatus having a flow rate detecting unit which is utilized for measuring air flow rate using a heat generating resistor provided in an air flow passage, comprising:

a linearizing circuit supplied with a signal from the flow rate detecting unit into a linearized signal;

a filter circuit supplied with the linearized signal from the linearizing circuit; and a nonlinear-form converting circuit supplied with a signal from the filter circuit;

wherein an output of the nonlinear-form converting circuit is extracted as a flow rate detecting signal.

2. An air flow rate measuring apparatus according to claim 1, wherein the flow rate detecting unit is provided with two resistors so that the flow rate detecting unit can detect backward flow.

3. An air flow rate measuring apparatus according to claim 1, wherein the nonlinear-form converting circuit is configured to convert input signal thereto into a signal having a characteristic with a steep slope in a low flow rate region and a gentle slope in a high flow rate region.

4. An air flow rate measuring apparatus according to claim 1, wherein the linearizing circuit carries out linear approximation on the relationship between an input signal thereto and the flow rate, and the nonlinear-form converting circuit carries out curve approximation on the relationship between an input signal thereto and the flow rate.

5. An air flow rate measuring apparatus according to claim 1 wherein the linearizing circuit comprises two-stage cascaded multiplying circuits, the filter circuit comprises a CR hard filter configured to suppress the amplitude of the linearized signal without changing the mean value thereof so as to generate a flow rate signal that has been subjected to an averaging operation, and the non-linear form converting circuit comprises an operational amplifier and a plurality of multiplying circuits.

6. An air flow rate measuring apparatus according to claim 1, wherein the filter circuit supplied with a linearized signal from the linearizing circuit is configured to calculate a mean value of the linearized signal, and the nonlinear-form converting circuit is configured to non-linearize the calculated mean value and output the flow rate detecting signal with a predetermined non-linear characteristic.

* * * * *